(12) United States Patent
Gong et al.

(10) Patent No.: US 7,285,922 B2
(45) Date of Patent: Oct. 23, 2007

(54) DRIVING APPARATUS FOR CCFL

(75) Inventors: Jung Chul Gong, Seoul (KR); Sang Cheol Shin, Kyungki-do (KR); Byoung Own Min, Suwon (KR); Chang Woo Ha, Suwon (KR)

(73) Assignee: Samsung Electro-Mechanics Co., Ltd., Kyungki-Do (KR)

( * ) Notice: Subject to any disclaimer, the term of this patent is extended or adjusted under 35 U.S.C. 154(b) by 0 days.

(21) Appl. No.: 11/421,219

(22) Filed: May 31, 2006

(65) Prior Publication Data

US 2006/0279235 A1 Dec. 14, 2006

(30) Foreign Application Priority Data

Jun. 13, 2005 (KR) .................... 10-2005-0050503

(51) Int. Cl.
*G05F 1/00* (2006.01)
(52) U.S. Cl. .................. 315/291; 315/224; 315/308; 315/307; 315/209 R; 315/244; 315/DIG. 5
(58) Field of Classification Search ............ 315/209 R, 315/291, 224, 244, 307, 308, 360, 362, DIG. 5, 315/DIG. 7; 363/98, 131, 95, 132
See application file for complete search history.

(56) References Cited

U.S. PATENT DOCUMENTS

| 6,114,814 | A  | * | 9/2000  | Shannon et al. ........... 315/219 |
| 6,259,615 | B1 | * | 7/2001  | Lin ............................. 363/98 |
| 6,281,642 | B1 | * | 8/2001  | Konishi et al. ............. 315/308 |
| 6,919,694 | B2 | * | 7/2005  | Moyer et al. ............... 315/224 |
| 6,927,989 | B2 | * | 8/2005  | Fukumoto .................... 363/95 |
| 2006/0284570 | A1 | * | 12/2006 | Gong et al. ................. 315/291 |

FOREIGN PATENT DOCUMENTS

JP         6243976        *   2/1994

* cited by examiner

*Primary Examiner*—Haissa Philogene
(74) *Attorney, Agent, or Firm*—Lowe Hauptman Ham & Berner

(57) ABSTRACT

The invention relates to a driving apparatus for a CCFL capable of providing a high output voltage necessary for an open lamp and thereby satisfying a voltage standard required to drive the lamp. In the driving apparatus, an inverter made of a switching circuit of a half-bridge structure is used to generate current for driving the lamp. If the lamp is open, a tuning capacitor current of an oscillator, which provides a reference clock for driving a switch of the inverter is incremented so that a clock frequency which is a basis for a switching speed of the inverter is boosted. This consequently increases the switching speed of the inverter and then an output voltage.

4 Claims, 6 Drawing Sheets

DRIVING APPARATUS FOR CCFL

CLAIM OF PRIORITY

This application claims the benefit of Korean Patent Application No. 2005-50503 filed on Jun. 13, 2005, in the Korean Intellectual Property Office, the disclosure of which is incorporated herein by reference.

BACKGROUND OF THE INVENTION

1. Field of the Invention

The present invention relates to a driving apparatus for a cold cathode fluorescent lamp (CCFL). More particularly, the present invention relates to a driving apparatus for a CCFL capable of providing a high output voltage necessary for an open lamp and thereby satisfying an output standard required to drive the lamp.

2. Description of the Related Art

A cold cathode fluorescent lamp (CCFL) has fluorescent material coated onto its interior wall of a glass tube. The CCFL has electrodes attached to both ends of the tube, where tens of Torr of gas mixtures and a predetermined amount of mercury are sealed. The CCFL bears plenty of advantages such as high brightness, high color rendering, low power consumption of 2.0 W to 5.0 W, long useful life of 15,000 to 60,000 hr in a rated lamp current. Therefore it is well-utilized as a lighting device such as an LCD backlight. However, the CCFL exhibits large impedance if current is not applied and smaller impedance once current is applied and the lamp is ignited. A driving voltage necessary to start the CCFL is at least 1300V and the voltage after ignition is at least 800V.

Consequently, an output voltage standard should be at least 1300V in case of starting the CCFL. Also even in the open-lamp condition, a high voltage standard of at least 1300V should be outputted during a predetermined period of time.

Figure 1:
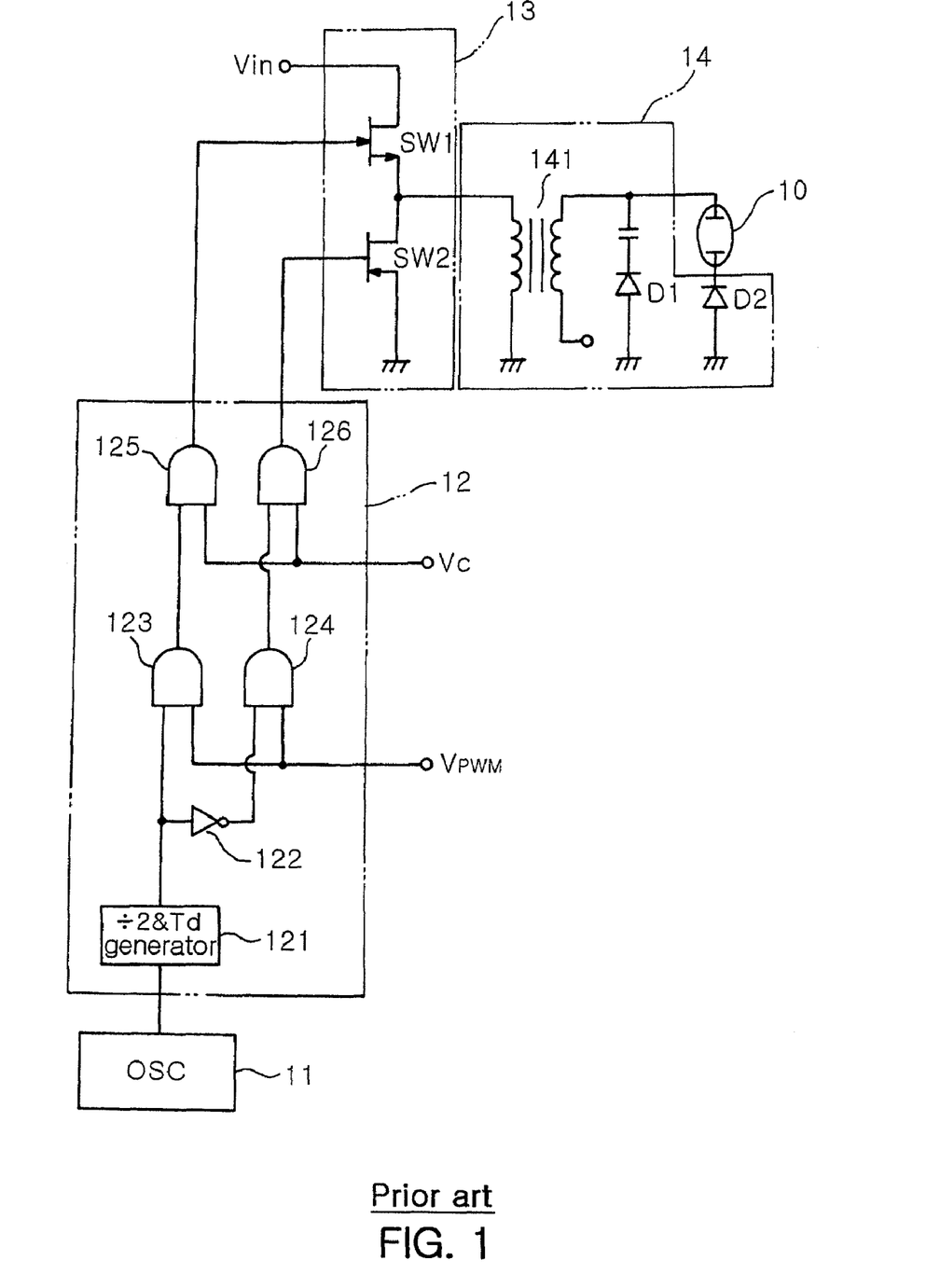
FIG. 1 is a circuit diagram illustrating a driving apparatus for a CCFL according to the prior art.

FIG. 1 is a circuit diagram showing a driving apparatus for a CCFL according to the prior art. Referring to FIG. 1, a device for turning on/off the CCFL 10 comprises: an oscillator 11 for providing a reference clock; an PWM driver 12 for generating a PWM switching control signal having an on/off duty rate varied according to a predetermined cycle based on the reference clock provided by the oscillator 11; an inverter 13 for inverting an inputted current into alternating voltage, the inverter including two switching devices SW1, SW2 of a half-bridge structure which switch on and off alternately in response to the switching control signal outputted from the PWM driver 12; and a resonance circuit 14 for outputting the alternating current of a predetermined frequency inputted from the inverter 13 to a lamp.

A switching cycle of the inverter 13, or frequency of the outputted alternating current is fixed at ½ of the reference clock generated in the oscillator 11 by the PWM driver 12. However, the PWM controller 12 adjusts an on/off duty rate in response to the PWM control signal $V_{PWM}$ to control an outputted driving voltage and brightness of the lamp. In this case, as the switching signal has a longer "on" duration, the level of the voltage outputted to the lamp 10 becomes higher.

At this time, as shown in FIG. 1, the driving apparatus for the lamp of a half-bridge structure has a maximum duty rate of the switching control signal to be 50% or less. Thus, only control of a pulse width as stated above cannot satisfy the voltage standard for starting the lamp and the output voltage standard for an open lamp.

SUMMARY OF THE INVENTION

The present invention has been made to solve the foregoing problems of the prior art and it is therefore an object of the present invention to provide a driving apparatus for a cold cathode fluorescent lamp (CCFL) capable of supplying a high output voltage required for an open lamp and thereby satisfying a voltage standard required to drive the lamp.

According to an aspect of the invention for realizing the object, there is provided the driving apparatus for the CCFL comprising: an oscillator for oscillating at a frequency based on a tuning resistor and a tuning capacitor, the oscillating frequency increasing in proportion to current flowing in the tuning capacitor; a pulse width modulation (PWM) driver for outputting a PWM switching control signal having an on/off duty rate adjusted, according to a predetermined cycle based on a reference clock outputted from the oscillator; an inverter for inverting direct current into alternating current of a predetermined frequency, the inverter including a plurality of switching devices of a half bridge structure which switch on and off alternately in response to the switching control signal outputted from the PWM driver; a resonance circuit for outputting the alternating current outputted from the inverter as a lamp driving voltage; a feedback circuit for detecting openness of the lamp through the feedback of a voltage applied to the lamp, and according to the openness detection, outputting a current control signal; and a current controller for increasing a tuning capacitor current of the oscillator if the lamp is open and for decreasing the tuning capacitor current of the oscillator to a reference level if the lamp is not open, in response to the current control signal applied from the feedback circuit.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENT

Preferred embodiments of the present invention will now be described in detail with reference to the accompanying drawings.

Figure 2:
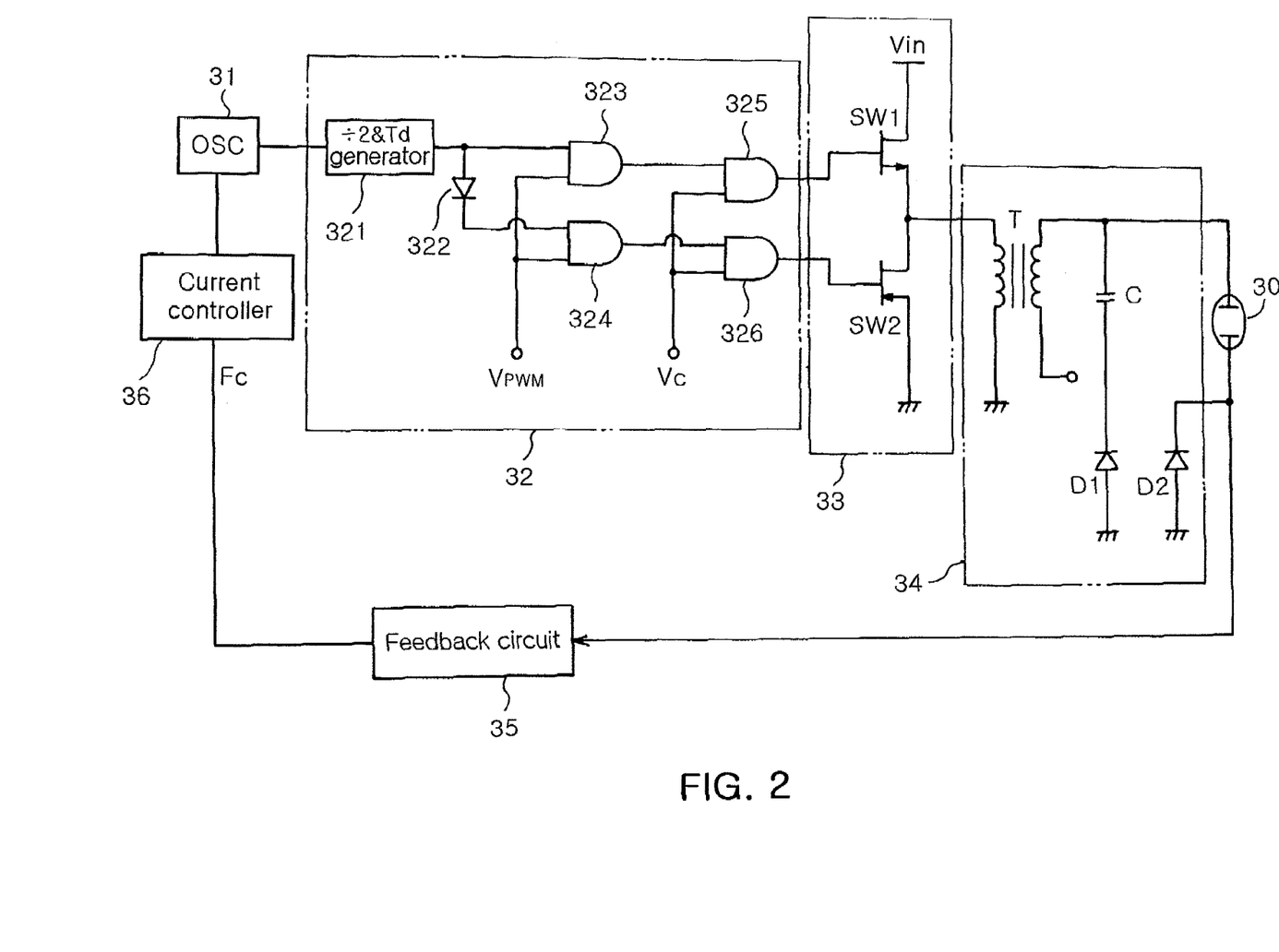
FIG. 2 is a block diagram illustrating a driving apparatus for a CCFL according to the invention.

FIG. 2 is a block diagram of a driving apparatus for a cold cathode fluorescent lamp (CCFL) according to the invention. Referring to FIG. 2, the driving apparatus for the CCFL includes an oscillator 31 for oscillating at a frequency based on a tuning resistor and a tuning capacitor, the oscillating frequency increasing in proportion to current flowing in the tuning capacitor; a pulse width modulation (PWM) driver 32 for outputting a PWM switching control signal having an on/off duty rate adjusted, according to a predetermined cycle based on a reference clock outputted from the oscillator 31; an inverter 33 for inverting direct current into alternating current of a predetermined frequency, the inverter including a plurality of switching devices SW1, SW2 of a half bridge structure which switch on and off alternately in response to the switching control signal outputted from the PWM driver 32; a resonance circuit 34 for outputting the alternating current outputted from the inverter 33 to a lamp 30; a feedback circuit 35 for detecting openness of the lamp 30 through the feedback of a voltage applied to the lamp 30, and according to the openness detection, outputting a current control signal FC; and a current controller 36 for increasing a tuning capacitor current of the oscillator 31 if the lamp is open and for decreasing the tuning capacitor current of the oscillator 31 to a reference level if the lamp is not open, in response to the current control signal FC applied from the feedback circuit 35.

The oscillator 31 is a general RC oscillator, which oscillates at a frequency based on a tuning resistor and a tuning capacitor of a resonance circuit in the oscillator 31. A detailed explanation thereof will not be given since its detailed circuit is commonly known. In this type of oscillator 31, an oscillating frequency is proportional to a tuning capacitor current of the resonance circuit. That is, variation in the tuning capacitor current of the oscillator 31 leads to adjustment in the oscillating frequency of the oscillator 31.

Therefore the driving apparatus for the CCFL of the invention is characterized such that the tuning capacitor current of the oscillator 31 is adjusted to increase a frequency of a reference clock in an open lamp condition and thus attain an output voltage required. That is, the frequency of the reference clock is increased to accelerate a switching speed and thereby boost an output voltage.

In this case, lamp openness can be detected and accordingly the tuning capacitor current can be controlled by the feedback circuit 35 and current controller 36. Construction and operation of the feedback circuit 35 and current controller 36 will be explained later in greater detail.

Next, the PWM driver 32 generates the PWM switching control signal having an on/off duty rate adjusted according to a predetermined cycle based on a reference clock outputted from the oscillator 31. The PWM 32 divides a frequency of a clock outputted from the oscillator 31 through a divider-Td generator 321 by ½ and then logically combines a result with a PWM control signal $V_{PWM}$ via logical devices 322 to 324. Thereafter, the PWM driver 32 adjusts the on/off duty rate of the PWM switching control signal to output to the inverter 33. At this time, in response to AND gates 325 and 326, the PWM switching control signal is transferred to the inverter 33 only in a normal condition but halted if a control signal VC indicative thereof is applied, in case of errors of the lamp 30. The PWM driver 32 is of a general construction and may be configured into other structure if necessary.

The inverter 33 inverts an input voltage Vin of direct current into alternating voltage of a predetermined frequency. In the driving apparatus for the CCFL of the invention, the switching circuit of the inverter 33 is half-bridge structured. Other type of inverter may be employed. However, in the case of two-stage type or full-stage type, a voltage standard required can be met by only PWM control. Thus the driving apparatus of the invention does not need to be configured.

Figure 3:
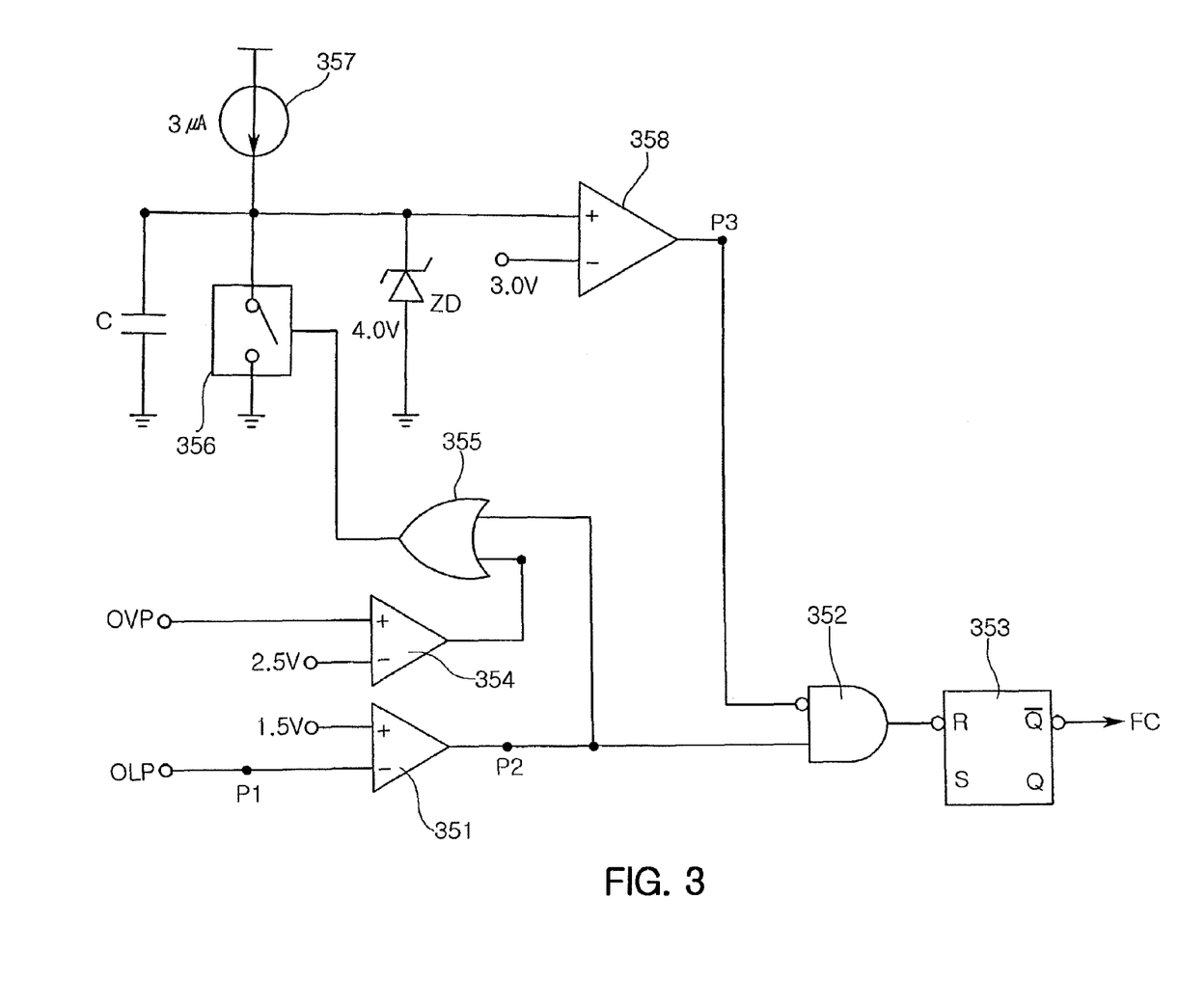
FIG. 3 is a detailed configuration view illustrating a feedback circuit of the driving apparatus for the CCFL according to the invention.

FIG. 3 is a detailed circuit diagram illustrating a feedback circuit 35 of the driving apparatus for the CCFL of the invention. Referring to FIG. 3, the feedback circuit 35 includes a first comparator 351 for comparing an open lamp detection voltage OLP with a reference voltage (1.5V); and an AND gate 352 for logically multiplying a result of the first comparator 351 by a result of a third comparator 358; an SR flip-flop 353 for receiving an inverted output signal of the AND gate 352 as a reset signal and outputting a current control signal FC to an output terminal $\overline{Q}$; a second comparator 354 for comparing an extinction detection voltage OVP of the lamp 30 with a reference voltage (e.g. 2.5V); an OR gate 355 for logically adding an output of the first comparator 351 to that of the second comparator 354; a switch 356 for switching on/off in response to an output of the OR gate 355; a current source 357 for applying current to a capacitor C if the switch 356 is off and being grounded through the switch 356 if the switch 356 is on; a zener diode ZD for limiting a voltage of the capacitor C to a predetermined level (e.g. 4.0V) or less, the zener diode coupled in parallel to the capacitor C; and the third comparator 358 for comparing the voltage of the capacitor C with a reference voltage (e.g. 3.0V) and providing a result to the AND gate 352.

The open lamp detection voltage OLP and lamp extinction detection voltage OVP as described above are sensed by a connecting terminal of the resonance circuit 34. The open lamp detection voltage OLP turns to the low level if the lamp is open and the high level if the lamp is not open. The extinction detection voltage OVP turns to the low level if the lamp 30 is extinguished and the high level if the lamp 30 is ignited.

Thereby, the first comparator 351 compares the open lamp detection voltage OLP with a reference voltage (1.5V) to output a logical value indicating whether or not the lamp 30 is open. If the lamp 30 is open, the high level signal is outputted whereas if the lamp 30 is not open, the low level signal is outputted.

Further, the second comparator 354 compares the extinction detection voltage OVP with a reference voltage (2.5V) to output a signal indicating whether or not the lamp 30 is extinguished. Under such conditions, in a lamp-on condition, the low level signal is outputted whereas in a lamp-out condition, the high level signal is outputted.

Thereafter, the OR gate 355 logically adds an output of the first comparator 351 and that of the second comparator 354. In the open-lamp condition, the OR gate 355 outputs the high level signal to turn a switch 356 on. Then, current of the current source 357 is bypassed to a ground. Consequently, a voltage of the capacitor C becomes the low level so that an output of the third comparator 358 turns to the low level.

The AND gate 352 logically multiplies an inverted output value of the first comparator 351 by that of the third comparator 358. If the lamp 30 is open, the high level signal is outputted, and invert-inputted to a reset terminal of the SR flip-flop 353. Therefore, the inverted high level signal is outputted to the output terminal $\overline{Q}$ of the SR flip-flop 353. In the end, if the lamp 30 is open, the current control signal FC of the low level is outputted.

An output level of the OR gate 355 becomes low or high depending on an output level of the second comparator 354, that is, whether the lamp 30 is ignited or extinguished. This allows the switch 356 to switch on/off.

On the contrary, if the lamp 30 is not open, the first comparator 351 outputs the low level signal and thus the AND gate 352 outputs the low level signal regardless of an output level of the third comparator 358. As a result, the high level signal is inputted to the reset terminal R of the RS flip-flop 353 so that the current control signal FC of the high level is outputted.

Figure 4:
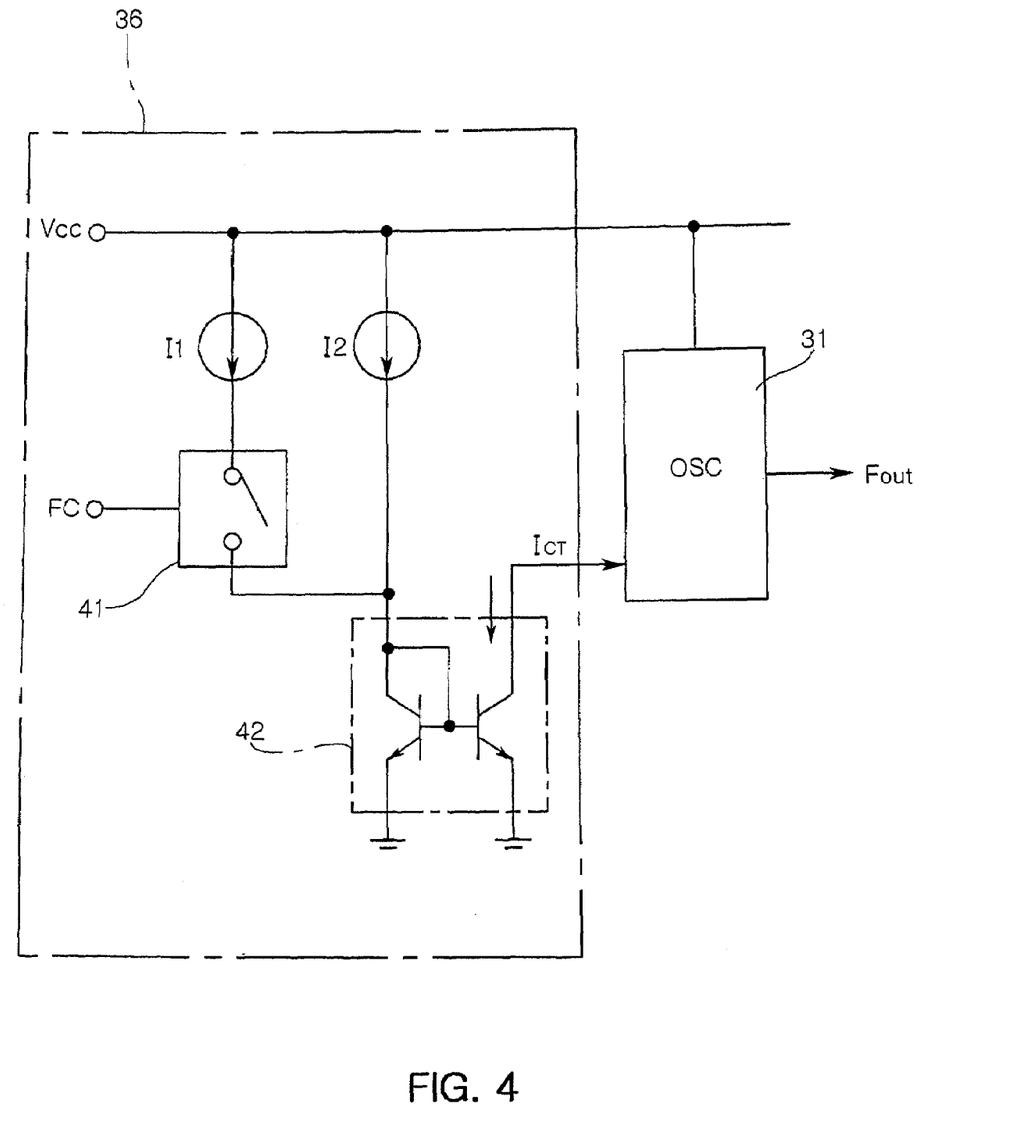
FIG. 4 is a configuration view illustrating a current controller of the driving apparatus for the CCFL according to the invention.

The current controller 36 controls a tuning capacitor current $I_{CT}$ of the oscillator 31 in response to the current control signal FC generated by the feedback circuit 35. FIG. 4 is a schematic configuration view of the current controller 36.

Referring to FIG. 4, a current controller 36 includes two current sources I1,I2 for supplying a predetermined current, respectively; a switch 41 for switching on/off in response to a current control signal FC from the feedback circuit 35; and a current mirror 42 for applying a sum of currents inputted in accordance with on/off of the switch as a tuning capacitor current of the oscillator 31, the mirror 42 connected to a first current source through the switch 41 and fixedly connected to a second current source.

That is, if the lamp 30 is open and a current control signal FC of the low level is applied through function of the feedback circuit 35 as noted above, the switch 41 is turned on to input a first current source I1 to the current mirror 42. Then the current mirror 42 adds current value of a second current source I2 steadily inputted to that of the first current source I1, and outputs the sum as the tuning capacitor current $I_{CT}$. If the lamp is normally coupled and the current control signal FC of the high level is applied, the switch 41 is turned off to block current supply of the first current source. Then, the current mirror 42 outputs only current applied by the second current source I2 as the tuning capacitor current.

Consequently, more current I1+I2 is applied as the tuning capacitor current of the oscillator 31 if the lamp 30 is open than if it is not. Subsequently, this enhances a frequency of a reference clock outputted from the oscillator 31 so that eventually a switching speed of the inverter 33 is incremented to boost an output voltage.

At this time, to satisfy a voltage standard required for the driving apparatus for the CCFL, an output frequency of the oscillator 30 of the open lamp 30 can be increased about 1.5 times over a frequency in a normal condition. Therefore, preferably, for the current controller 36, the tuning capacitor current should be adjusted so that the frequency of the oscillator 31 increases about 1.5 times. In this case, the desired tuning capacitor current amount is attainable by adjusting a current level of the first current source I1.

Figure 5:
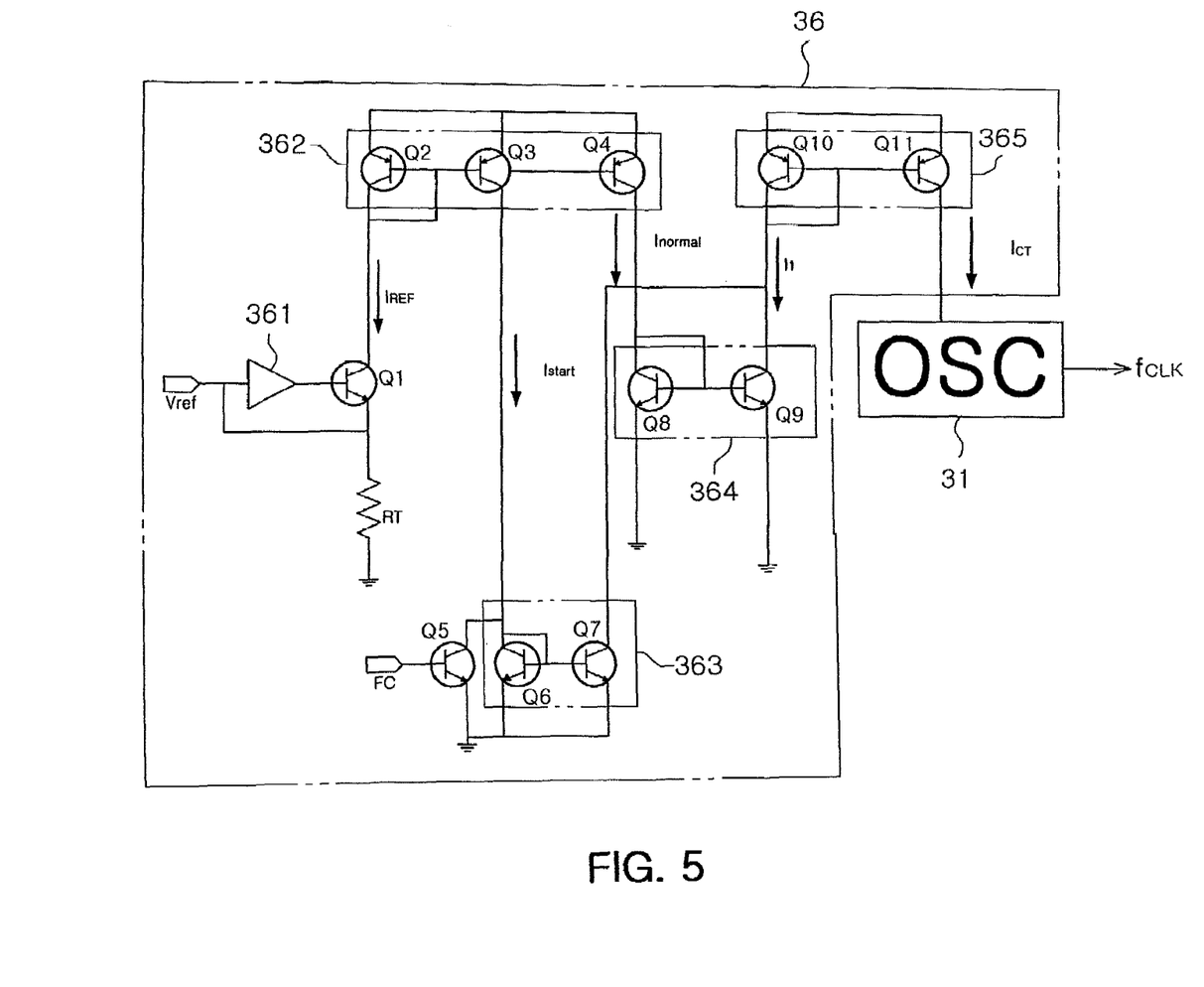
FIG. 5 is a detailed circuit diagram illustrating the current controller of the driving apparatus for the CCFL according to the invention.

FIG. 5 is a detailed circuit diagram illustrating more specific embodiment of the current controller 36 of the driving apparatus for the CCFL according to the invention.

Referring to FIG. 5, the current controller 36 includes a buffer 361 for receiving a reference voltage Vref; a first transistor Q1 having an emitter terminal, which is grounded via a resistor RT, and a base connected to an output of the buffer 361; a current repeater 362 including a second transistor Q2 having a base and a collector commonly coupled to a collector of the first transistor Q1, and third and fourth transistors Q3,Q4 each having a base and an emitter commonly coupled to the base and an emitter of the second transistor Q2, respectively; a fifth transistor Q5 for operating on/off in response to the current control signal FC, the transistor Q5 collector-emitter coupled between a collector of the third transistor Q3 and a ground; a first current mirror 363 including a collector-grounded, sixth transistor Q6 having an emitter and a base connected to the collector of the third transistor Q3, and a collector-grounded, seventh transistor Q7 having a base connected to the collector of the third transistor Q3; a second current mirror 364 including an emitter-grounded, eight transistor Q8 having a collector and a base coupled to a collector of the fourth transistor Q4, and an emitter-grounded, ninth transistor Q9 having a base connected to the collector of the fourth transistor Q4; and a third current mirror 365 including a tenth transistor Q10 having a collector and a base commonly coupled to the collectors of the seventh and ninth transistors Q7, Q9, and an eleventh transistor Q11 base-emitter coupled to the tenth transistor Q10 and having a collector connected to the tuning capacitor (not illustrated) of the oscillator 31.

With respect to operation of the current controller 36, first, a reference current $I_{REF}$ of the current repeater 362 is determined by the reference voltage Vref and resistor RT. The reference current $I_{REF}$ is expressed by an equation $$I_{REF} = \frac{V_{ref}}{RT}.$$

Also, by functions of the current repeater 362, current almost identical to the reference current $I_{REF}$ flows in the collectors of the third transistor Q3 and fourth transistor Q4. Hereinafter, the collector current of the third transistor Q3 is called a start current $I_{start}$ and the collector current of the fourth transistor Q4 is called a normal current $I_{normal}$.

Further, operation of the first current mirror 363 is determined in response to the current control signal FC from the feedback circuit 35. That is, in case of the open lamp, if the current control signal FC of the low level is applied from the feedback circuit 35, the fifth transistor Q5 is turned off and the start current $I_{start}$ is inputted as the reference current of the first current mirror 363. Then the start current $I_{star}$ is mirrored to the third current mirror 36 by the first current mirror 363. In contrast, in a normal condition where the lamp 30 is not open, the current control signal FC of the high level is inputted from the feedback circuit 35. Then the fifth transistor Q5 is turned on to bypass the start current $I_{start}$ flowing in the collector of the third transistor Q3 to a ground. Consequently, the first current mirror 363 does not operate so that the start current $I_{start}$ is not mirrored to the third current mirror 365.

At this time, the second current mirror 364 applies current $I_{normal}$ flowing in the collector of the fourth transistor Q4 to the $10^{th}$ transistor Q10 of the third current mirror 365.

Then, the third current mirror 365 mirrors current inputted to the tenth transistor Q10 of the third current mirror 365 and applies the same as the tuning capacitor current $I_{CT}$ to the oscillator 31.

As a result, an output current of the third current mirror 365 is expressed by an equation $I_{ct}=I_{normal}$ if the lamp 30 is not open, and $I_{ct}=I_{normal}+I_{start}$ if the lamp 30 is open. Therefore, the current controller 36 as shown in FIG. 5 can adjust the tuning capacitor current $I_{CT}$ of the oscillator 31 to a higher level if the lamp 30 is open than if it is not. As explained earlier, consequently, a switching speed of the inverter 33 can be accelerated in case of the open lamp to increase output to a standard level (at least 1300V).

Figure 6:
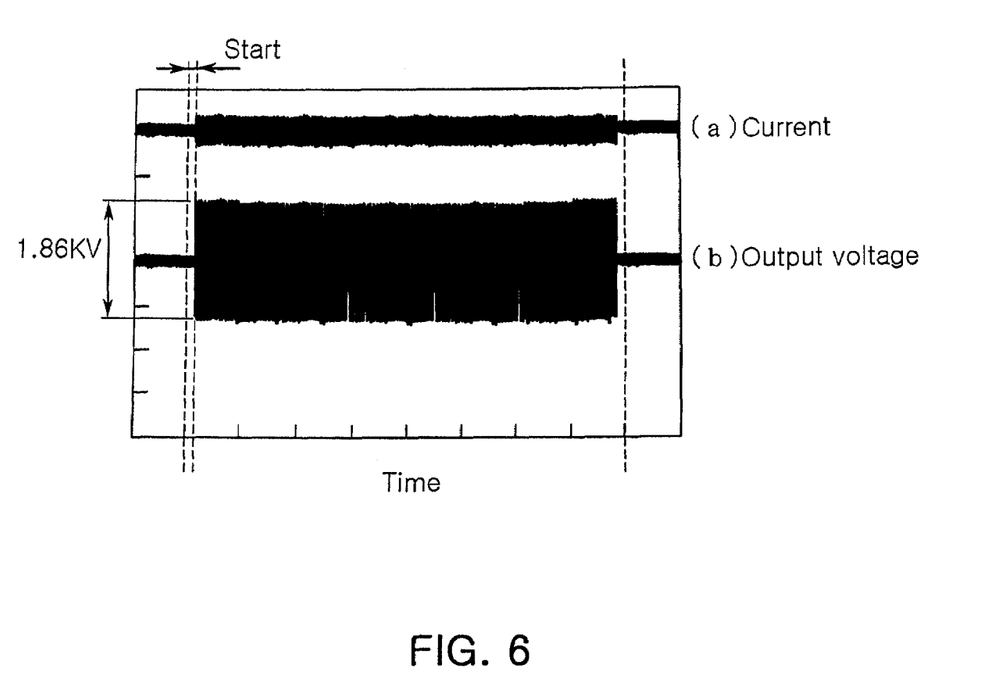
FIG. 6 is a graph illustrating a simulation result of the driving apparatus for the CCFL according to the invention.

FIG. 6 is a simulation result illustrating the driving apparatus for the CCFL of the invention, in which (a) shows current outputted from a resonance circuit 34 in case of an open lamp 30, and (b) shows a voltage outputted from the resonance circuit 34 in case of the open lamp 30. At this time, an oscillating frequency of the oscillator 31 is set to be 1.5 times higher if the lamp is open than if it is not.

Referring to the graph of FIG. 6, if the lamp is open, an output voltage of the driving apparatus for the CCFL is incremented to about 1.86 kV so as to satisfy a voltage standard (about 1.3 KV).

As set forth above, the invention ensures that an output voltage standard of the CCFL required for an open lamp is satisfied by adjusting a frequency of a reference clock. As a result, the invention advantageously allows a stable ignition of the lamp.

While the present invention has been shown and described in connection with the preferred embodiments, it will be apparent to those skilled in the art that modifications and variations can be made without departing from the spirit and scope of the invention as defined by the appended claims.

What is claimed is:

1. A driving apparatus for a cold cathode fluorescent lamp (CCFL), comprising:
    an oscillator for oscillating at a frequency based on a tuning resistor and a tuning capacitor, the oscillating frequency increasing in proportion to current flowing in the tuning capacitor;
    a pulse width modulation (PWM) driver for outputting a PWM switching control signal having an adjusted on/off duty rate and a predetermined cycle based on a reference clock outputted from the oscillator;
    an inverter for inverting direct current into alternating current of a predetermined frequency, the inverter including a plurality of switching devices of a half bridge structure which switch on and off alternately in response to the switching control signal outputted from the PWM driver;
    a resonance circuit for outputting the alternating current outputted from the inverter as a lamp driving voltage;
    a feedback circuit for detecting openness of the lamp through the feedback of a voltage applied to the lamp, and according to the openness detection, outputting a current control signal; and
    a current controller for increasing a tuning capacitor current of the oscillator if the lamp is open and for decreasing the tuning capacitor current of the oscillator to a reference level if the lamp is not open, in response to the current control signal applied from the feedback circuit.

2. The driving apparatus according to claim 1, wherein the feedback circuit comprises:
    a first comparator for sensing an open lamp detection voltage in the resonance circuit and comparing the open lamp detection voltage with a first reference voltage;
    an AND gate for logically multiplying a result of the first comparator by a result of a third comparator;
    an SR flip-flop for receiving an inverted output signal of the AND gate as a reset signal and outputting the current signal to an output terminal;
    a second comparator for comparing an extinction detection voltage of the lamp with a second reference voltage,
    an OR gate for logically adding an output of the first comparator to that of the second comparator;
    a switch for switching on/off in response to an output of the OR gate;
    a current source for applying current to a capacitor if the switch is off and being grounded through the switch if the switch is on;
    a zener diode for limiting a voltage of the capacitor to a predetermined level or less, the zener diode coupled in parallel to the capacitor; and
    the third comparator for comparing the voltage of the capacitor with a third reference voltage and providing a result to the AND gate.

3. The driving apparatus according to claim 1, wherein the current controller comprises:
    two current sources for supplying a predetermined current, respectively;
    a switch for switching on/off in response to the current control signal from the feedback circuit; and
    a current mirror for applying a sum of currents inputted in accordance with on/off of the switch as a tuning capacitor current of the oscillator, the mirror connected to a first current source through the switch and fixedly connected to a second current source.

4. The driving apparatus according to claim 1, wherein the current controller comprises:
    a buffer for receiving a reference voltage;
    a first transistor having an emitter terminal grounded through a resistor and a base connected to an output of the buffer;
    a current repeater including a second transistor having a base and a collector commonly coupled to a collector of the first transistor, and third and fourth transistors each having a base and an emitter commonly coupled to the base and an emitter of the second transistor, respectively;
    a fifth transistor for operating on/off in response to the current control signal, the transistor collector-emitter coupled between a collector of the third transistor and a ground;
    a first current mirror including a collector-grounded, sixth transistor having an emitter and a base connected to the collector of the third transistor, and a collector-grounded, seventh transistor having a base connected to the collector of the third transistor;
    a second current mirror including an emitter-grounded, eighth transistor having a collector and a base coupled to a collector of the fourth transistor, and an emitter-grounded, ninth transistor having a base connected to the collector of the fourth transistor; and
    a third current mirror including a tenth transistor having a collector and a base commonly coupled to the collectors of the seventh and ninth transistors, and an eleventh transistor base-emitter coupled to the tenth transistor and having a collector connected to the tuning capacitor of the oscillator.

* * * * *